United States Patent Office 3,201,449
Patented Aug. 17, 1965

3,201,449
2-CHLORO-3,4,4-TRICYANO - 1 - PERHALOALKYL-THIO-1-AZA-1,3-BUTADIENES AND THEIR PREPARATION
Harris D. Hartzler, Wilmington, Del., assignor to E. I. du Pont de Nemours and Company, Wilmington, Del., a corporation of Delaware
No Drawing. Filed Sept. 19, 1962, Ser. No. 224,841
16 Claims. (Cl. 260—465)

This invention relates to, and has as its principal objects provisions of, novel, acyclic, unsaturated compounds having several substituents and a process for the preparation of the same.

The new class of polycyanosubstituted unsaturated compounds now provided has the formula:

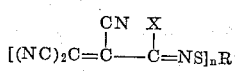

wherein X is is a halogen of atomic number 17–35, inclusive, i.e., chlorine or bromine, R is a polyhalogenated, saturated, aliphatic hydrocarbon radical having a valence of 1–2, inclusive, i.e., a polyhaloalkyl or polyhaloalkylene radical, and $n$ is the valence of R, i.e., 1 or 2. Solely because of availability or ease of preparaiton, R preferably contains up to 10 carbons. As used in connection with R, "polyhalogenated" means containing at least two atoms of one or more of fluorine and chlorine.

These products are prepared by reaction of tetracyanoethylene with a polyhalogenated, aliphatic hydrocarbonsulfenyl chloride or bromide of the formula $R(SX)_n$ where R, X, and $n$ have the meanings defined above in a suitable solvent (see below). This reaction is illustrated by the following equations

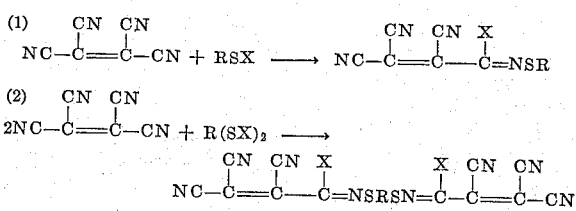

In this reaction one mole of tetracyanoethylene reacts with one mole of a polyhaloalkanesulfenyl halide, while two moles of tetracyanoethylene are required for each mole of polyhaloalkylene-bis(sulfenyl halide). However, a slight excess of the sulfenyl halide, e.g., up to a 10% molar excess, is usually employed. A still larger excess can be used but it is not necessary.

Specific solvents suitable in the invention include cyclic ethers, e.g., tetrahydrofuran; glycol ethers, e.g., ethylene glycol dimethyl ether; lower aliphatic nitriles, e.g., acetonitrile; and halogenated aliphatic hydrocarbons, e.g., methylene chloride; etc.

The reaction system should preferably be anhydrous. The presence of any moisture in the reaction mixture causes a loss of the sulfenyl halide reactant. Consequently, the presence of water is to be avoided in order to obtain best yields of the desired products.

The reaction can be carried out over a broad range of temperatures. Temperatures of 0° C., or lower, up to about 100° C. are operable. Reaction temperatures between 20° C. and 80° C. are preferred. Temperatures below 0°, e.g., as low as −40° C., are operable when a catalyst is employed in the reaction mixture.

The reaction of the tetracyanoethylene with the polyhalogenated hydrocarbonsulfenyl halide is catalyzed by halide ions. Suitable catalysts are ionic chlorides or bromides that are soluble in the reaction medium. Examples of operable catalysts include quaternary ammonium bromides and chlorides, e.g., tetraethylammonium chloride and tetramethylammonium bromide. When a sulfenyl bromide is the reactant, a catalyst providing bromide ions is employed, and when the sulfenyl halide is a chloride, a catalyst providing chloride ions should be employed. The amount of catalyst that can be used ranges from 0.1% up to 10% of the weight of the sulfenyl halide reactant.

The time required for the reaction to be completed depends on the particular sulfenyl halide, the particular solvent, the particular catalyst, if any is used, and the reaction temperature employed. In general, reaction times ranging from a few hours, e.g., 4–8 hours, up to several days, e.g., 6–8 days, are satisfactory.

At the completion of the reaction the reaction product can be isolated from the reaction mixture by conventional methods. For example, the reaction mixture can be filtered to remove any insoluble material and the filtrate then evaporated under reduced pressure to remove the solvent. The residue can then be purified by crystallization from a suitable solvent, e.g., hexane.

The tetracyanoethylene used in the process of this invention can be prepared by known methods. For example, it can be prepared by the methods described in U.S. Patents 2,794,823 and 2,794,824. The polyhalogenated aliphatic hydrocarbonsulfenyl halides can likewise be prepared by known methods. For example, trifluoromethanesulfenyl chloride can be made by reaction of trifluoromethyl disulfide with chlorine as described by Haszeldine and Kidd in J. Chem. Soc. 1953, 3219. 1,1,2,2-tetrafluoroethane-bis(sulfenyl chloride) can be prepared by the reaction of 5,5,6,6-tetrafluoro-1,2,3,4-tetrathiacyclohexane with chlorine. The 5,5,6,6-tetrafluoro-1,2,3,4-tetrathiacyclohexane can be made by the reaction of tetrafluoroethylene with sulfur.

This invention is illustrated in further detail by the following examples in which the proportions of ingredients are expressed in parts by weight unless otherwise stated.

EXAMPLE I

*Preparation of 2-chloro-1-trifluoromethylthio-3,4,4-tricyano-1-aza-1,3-butadiene*

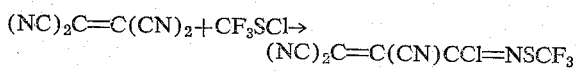

A mixture of 38 parts of tetracyanoethylene, 37.5 parts of trifluoromethanesulfenyl chloride and 180 parts of anhydrous acetonitrile is stirred for 30 hrs. at room temperature (25° C.). The mixture is filtered to remove a small amount of insoluble material, and the filtrate is evaporated to dryness under reduced pressure (25 mm. Hg). There remains 70 parts of a dark solid. This solid is triturated with boiling hexane and the hexane solution obtained is decanted and cooled. When cooling is completed, 43 parts of 2-chloro-1-trifluoromethylthio-3,4,4-tricyano-1-aza-1,3-butadiene precipitates as yellow plates. Recrystallization from hexane gives 39.8 parts (50% yield) of product melting at 85–86° C.

*Analysis.*—Calcd. for $C_7N_4F_3SCl$: C, 31.77%; N, 21.17%; F, 21.54%; S, 12.12%; Cl, 13.40%. Found: C, 32.59%; N, 21.14%; F, 21.24%; S, 11.98%; Cl, 13.49%.

The infrared absorption spectrum of this product shows absorption due to conjugated nitrile at 4.48 microns conjugated carbon-carbon double bond at 6.35 microns, conjugated carbon-nitrogen double bond at 6.55 microns and carbon-fluorine bond at 8 microns. Additional evidence for the conjugated system in the above proposed structure is shown by visible absorption at 355 millimicrons ($\epsilon = 8,700$).

EXAMPLE II

*Preparation of 2-chloro-1-trifluoromethylthio-3,4,4-tricyano-1-aza-1,3-butadiene*

A mixture of 64 parts of tetracyanoethylene, 75 parts of trifluoromethanesulfenyl chloride, 2 parts of tetraethylammonium chloride as catalyst, and 750 parts of methylene chloride is stirred under a nitrogen atmosphere for 5 days at room temperature. At the end of this period the mixture is filtered and the filtrate is evaporated to dryness under reduced pressure (25 mm. Hg). On recrystallization of the residue from hexane there is obtained 103 parts (77% yield) of 2-chloro-1-trifluoromethylthio-3,4,4-tricyano-1-aza-1,3-butadiene.

EXAMPLE III

*Preparation of 2-chloro-1-trichloromethylthio-3,4,4-tricyano-1-aza-1,3-butadiene*

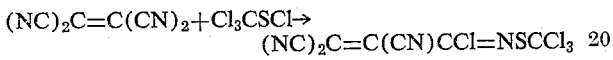

$$(NC)_2C=C(CN)_2+Cl_3CSCl \rightarrow$$
$$(NC)_2C=C(CN)CCl=NSCCl_3$$

A mixture of 10.7 parts of tetracyanoethylene, 18.6 parts of trichloromethanesulfenyl chloride, 0.6 part of tetraethylammonium chloride (catalyst) and 130 parts of ethylene chloride is heated at reflux temperature (84° C.) for two days. The mixture is cooled to 0° C. and filtered. The separated solid is rinsed with ether and then dried and there is obtained 8.03 parts of unchanged tetracyanoethylene. The filtrate is evaporated to dryness under reduced pressure (25 mm.). The residual solid is triturated with 113 parts of boiling hexane. The hexane solution obtained is decanted and evaporated under reduced pressure. The residue is crystallized from 15 parts of hexane and there is obtained 0.42 part (6.4% yield based on the tetracyanoethylene consumed) of 2-chloro - 1 - trichloromethylthio-3,4,4-tricyano-1-aza-1,3-butadiene as yellow crystals melting at 87–90.5° C.

*Analysis.*—Calcd. for $C_7N_4SCl_4$: C, 26.77%; N, 17.84%; S, 10.21%. Found: C, 28.12%; N, 18.03%; S, 9.81%.

The structure of this product is confirmed by its infrared absorption spectrum which shows absorption due to conjugated nitrile at 4.50 microns, conjugated carbon-carbon double bond at 6.31 microns and conjugated carbon-nitrogen double bond at 6.55 microns.

EXAMPLE IV

*Preparation of N,N'-(tetrafluoroethylenedithio)bis-(tricyanoacrylimidoyl chloride)*

$$2(NC)_2C=C(CN)_2+ClSCF_2CF_2SCl \rightarrow$$
$$(NC)_2C=C(CN)CCl=NSCF_2CF_2SN$$
$$=CClC(CN)=C(CN)_2$$

A mixture of 25.6 parts of tetracyanoethylene, 23.5 parts of 1,1,2,2-tetrafluoroethane-bis(sulfenyl chloride) and 90 parts of anhydrous acetonitrile is stirred for 3 days at room temperature. The mixture is evaporated to dryness under a current of nitrogen. The oily residue that remains is triturated with 120 parts of boiling hexane. The hexane solution obtained is decanted and cooled. The cold mixture is filtered and there is obtained 1.42 parts of an amorphous yellow solid which is shown to be N,N' - (tetrafluoroethyleneditho)bis(tricyanoacrylimidoyl chloride) by the presence of infrared absorption at 4.48 microns (conjugated nitrile), 6.31 and 6.55 microns (conjugated carbon-carbon and carbon-nitrogen double bonds) and 8 microns (carbon-fluorine).

The example have illustrated the products and process of this invention by specific reference to the reaction of tetracyanoethylene with certain polyhalogenated, saturated, aliphatic hydrocarbonsulfenyl halides. However this invention includes any product of the formula $[(NC)_2C=C(CN)CX=NS]_nR$ wherein the symbols have the meanings defined hereinbefore. Examples of other products of this invention which can be made by the methods illustrated in the examples are listed in the second column of the following Table I. The specific sulfenyl halides which can be reacted with tetracyanoethylene to give these products are listed in the first column of Table I.

TABLE I

| Sulfenyl Halide Reactant | Product |
| --- | --- |
| $CF_3SBr$ | $(NC)_2C=C(CN)CBr=NSCF_3$ |
| $CF_2ClSCl$ | $(NC)_2C=C(CN)CCl=NSCF_2Cl$ |
| $CFCl_2SCl$ | $(NC)_2C=C(CN)CCl=NSCFCl_2$ |
| $HCFClCF_2SCl$ | $(NC)_2C=C(CN)CCl=NSCF_2CHFCl$ |
| $CF_2ClCF_2SCl$ | $(NC)_2C=C(CN)CCl=NSCF_2CF_2Cl$ |
| $HCF_2CF_2SCl$ | $(NC)_2C=C(CN)CCl=NSCF_2CHF_2$ |
| $CCl_3CHClSCl$ | $(NC)_2C=C(CN)CCl=NSCHClCCl_3$ |
| $HCF_2CHFSCl$ | $(NC)_2C=C(CN)CCl=NSCHFCHF_2$ |
| $CF_2ClCH_2SCl$ | $(NC)_2C=C(CN)CCl=NSCH_2CF_2Cl$ |
| $CF_3CH_2SCl$ | $(NC)_2C=C(CN)CCl=NSCH_2CF_3$ |
| $CF_3CF_2CF_2SCl$ | $(NC)_2C=C(CN)CCl=NSCF_2CF_2CF_3$ |
| $(CF_3)_2CFSCl$ | $(NC)_2C=C(CN)CCl=NSCF(CF_3)_2$ |
| $CF_3(CF_2)_3SCl$ | $(NC)_2C=C(CN)CCl=NS(CF_2)_3CF_3$ |
| $CF_3(CF_2)_8SCl$ | $(NC)_2C=C(CN)CCl=NS(CF_2)_8CF_3$ |

The products of this invention are useful as chemical intermediates. More particularly, they undergo rapid reaction with dienes in the Diels-Alder reaction. This reaction is illustrated by the following examples.

EXAMPLE A

*Reaction of 2-chloro-1-trifluoromethylthio-3,4,4-tricyano-1-aza-1,3-butadiene with butadiene*

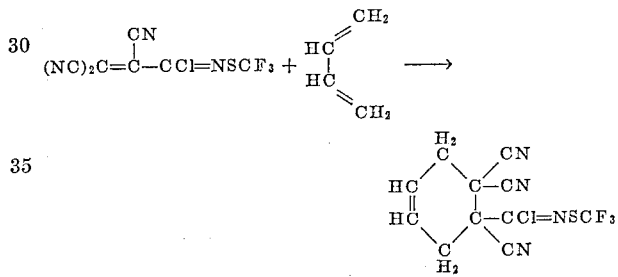

A slurry of 10.8 g. (0.04 mole) of 2-chloro-1-trifluoromethylthio-3,4,4-tricyano-1-aza-1,3-butadiene in 50 ml. of diethyl ether is stirred at room temperature while 1,3-butadiene is introduced into the mixture. The solution darkens and the temperature rises to 50° C. as a precipitate separates. The precipitate is removed by filtration and the filtrate is evaporated to dryness. The residue is recrystallized from hexane and there is obtained 4.07 g. of crude adduct, having the formula shown above, M.P. ca. 90° C. Recrystallization from dibutyl ether raises the melting point to 104–104.6° C.

*Analysis.*—Calcd. for $C_{11}H_6N_4ClSF_3$: C, 41.45%; H, 1.90%; N, 17.58%; Cl, 11.13%; S, 10.08%. Found: C, 41.74%; H, 2.19%; N, 17.73%; Cl, 11.29%; S, 9.95%.

The infrared absorption spectrum of the adduct is very similar to that obtained from the reaction product of Example B.

EXAMPLE B

*Reaction of 2-chloro-1-trifluoromethylthio-3,4,4-tricyano-1-aza-1,3-butadiene with 2,3-dimethylbutadiene*

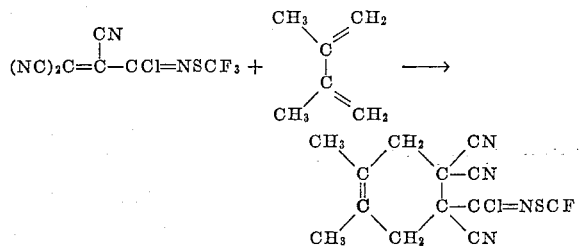

To a solution of 2.66 g. of 2-chloro-1-trifluoromethylthio-3,4,4-tricyano-1-aza-1,3-butadiene (0.01 mole) in 25 ml. of diethyl ether is added a solution of 1.0 g. (0.012 mole) of 2,3-dimethyl-1,3-butadiene in 5 ml. of diethyl ether. The temperature rises to 30° C. The mixture is stirred overnight. The solvent is evaporated from the mixture under a nitrogen atmosphere and the residue is crystallized from benzene-hexane (1:3) to give 2.51 g. of gray crystals, M.P. 110–115° C. Further crystallization from benzene-hexane (1:3) gave a white solid having the formula shown above and a melting point of 114.5–116° C.

*Analysis.*—Calcd. for $C_{13}H_{10}N_4SClF_3$: C, 45.02%; H, 2.92%; N, 16.16%; S, 9.25%; Cl, 10.24%; F, 16.39%. Found: C, 45.36%; H, 3.36%; N, 15.98%; S, 8.85%; Cl, 10.73%; F. 16.43%.

The infrared absorption spectrum of the adduct is consistent with the assigned structure. There is weak absorption at 4.46 microns attributable to the saturated nitrile group; absorptions at 6.1 and 6.15 microns attributable to the carbon-carbon and carbon-nitrogen double bonds. Strong CF absorption is present at 8–9 microns.

EXAMPLE C

*Reaction of 2-chloro-1-trifluoromethylthio-3,4,4-tricyano-1-aza-1,3-butadiene with anthracene*

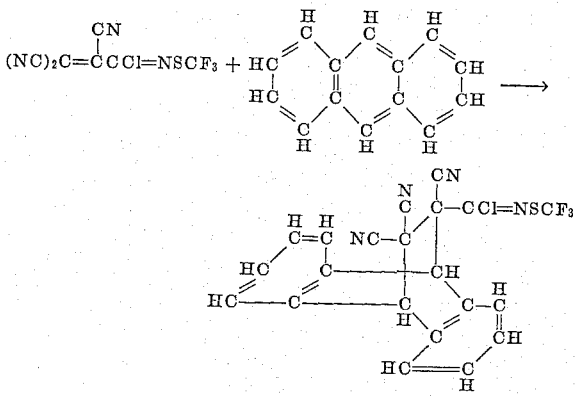

A solution of 2.70 g. of 2-chloro-1-trifluoromethylthio-3,4,4-tricyano-1-aza-1,3-butadiene and 1.8 g. of anthracene in 50 ml. of benzene is heated at 60° C. The green color of the π-complex which forms on mixing the reactants slowly disappears. After 18 hours the mixture is cooled in ice, filtered, and the white solid that separates out is rinsed with ether to give 1.16 g. of crude adduct, M.P. 111–117° C., having the formula shown above. A second crop of product amounting to 2.0 g. is obtained by evaporating the filtrate to a volume of 5 ml. The product is purified by rinsing with ether. The purified adduct melts at 143–147° C.

*Analysis.*—Calcd. for $C_{21}H_{10}N_4SClF_3$: C, 56.95%; H, 2.28%; N, 12.65%. Found C, 56.98%; H, 2.17%; N, 12.79%.

The infrared absorption spectrum of the adduct exhibits absorptions due to carbon-carbon and carbon-nitrogen double bonds at 6.1 and 6.2 microns, $SCF_3$ at 13.1 microns, C—F at 8–9 microns, and very weak absorptions at 4.5 microns (C≡N). The infrared absorption spectrum is completely consistent with the assigned structure.

The ability of the products of this invention to undergo the Diels-Alder reaction makes them especially useful for removing dienes, e.g., of up to 14 carbons, from mixtures of hydrocarbons containing dienes as impurities. For example, a mixture of hydrocarbons containing butadiene can be treated with a 2-halo-3,4,4-tricyano-1-(polyhaloalkyl)thio-1-aza-1,3-butadiene, preferably by passing a gas stream containing the butadiene-hydrocarbon mixture through a solution of the 2-halo-3,4,4-tricyano-1-(polyhaloalkyl)thio-1-aza-1,3-butadiene in a solvent such as an aromatic hydrocarbon or a solvent such as acetonitrile or ethylene chloride. The butadiene reacts rapidly at or slightly above room temperature and the Diels-Alder adduct that is formed remains in solution in the solvent.

The Diels-Alder adducts of the products of this invention are useful as agricultural fungicides. For example, the product of Example B applied at a concentration of 0.01% is 100% effective in controlling apple scab and both early and late tomato blight.

The products of this invention are also useful as lubricant additives. In this application they are effective as extreme pressure additives in both ester type and mineral oil lubricants. For example, a commercial ester type lubricant to which is added 0.55%, by weight, of 2-chloro-1 - trifluoromethylthio-3,4,4-tricyano-1-aza-1,3-butadiene increases the initial seizure load in the Falex load-carrying test from 2250 lbs. for the unmodified lubricant to 2825 lbs., and increases the seizure load from 2610 lbs. to more than 4500 lbs. Similarly, the addition of 0.58% of this same additive to a commercial white mineral oil produces an initial seizure load in the Falex test of 3415 lbs. and increases the seizure load from 600 lbs. to more than 4500 lbs. For purposes of comparison, the addition of 0.5% of tricresyl phosphate to the same ester lubricant decreases the initial seizure load in the Falex test from 2250 lbs. to 2175 lbs., and the seizure load from 2610 lbs. to 2575 lbs.; and the addition of 0.5% tricresyl phosphate to the same white mineral oil increases the seizure load from 600 lbs. to 1900 lbs.

Since obvious modifications and equivalents in the invention will be evident to those skilled in the chemical arts, I propose to be bound solely by the appended claims.

The embodiments of the invention in which an exclusive property or privilege is claimed are defined as follows:

1. Compounds of the formula $$[(NC)_2C=\overset{CN}{\overset{|}{C}}\text{—}\overset{X}{\overset{|}{C}}=NS]_nR$$

wherein: X is halogen of atomic number 17–35, inclusive; R is selected from the group consisting of polyfluoroalkyl, polychloroalkyl, polyfluoroalkylene and polychloroalkylene of up to 10 carbons; and *n*, the valence of R, is an integer of from 1 to 2.

2. 2 - chloro - 1 - trifluoromethylthio - 3,4,4 - tricyano-1-aza-1,3-butadiene.

3. 2 - chloro - 1 - trichloromethylthio - 3,4,4 - tricyano-1-aza-1,3-butadiene.

4. N,N' - (tetrafluoroethylenedithio)bis(tricyanoacrylimidoyl chloride).

5. An adduct of a diene of up to 14 carbons and a compound of the formula $$[(NC)_2C=\overset{CN}{\overset{|}{C}}\text{—}\overset{X}{\overset{|}{C}}=NS]_nR$$

wherein: X is halogen of atomic number 17–35, inclusive; R is selected from the group consisting of polyfluoroalkyl, polychloroalkyl, polyfluoroalkylene and polychloroalkylene of up to 10 carbons; and *n*, the valence of R, is an integer of from 1 to 2.

6. The adduct of butadiene and 2-chloro-1-trifluoromethylthio-3,4,4-tricyano-1-aza-1,3-butadiene.

7. The adduct of 2,3-dimethylbutadiene and 2-chloro-1 - trifluoromethylthio - 3,4,4 - tricyano - 1 - aza - 1,3-butadiene.

8. The adduct of anthracene and 2-chloro-1-trifluoromethylthio-3,4,4-tricyano-1-aza-1,3-butadiene.

9. The process which comprises reacting, in a solvent selected from the group consisting of cyclic ethers, glycol ethers, lower aliphatic nitriles and halogenated aliphatic hydrocarbons and at a temperature of less than about 100° C., tetracyanoethylene with a compound of the formula $R(SX)_n$ wherein: X is halogen of atomic number 17–35, inclusive; R is selected from the group consisting of polyfluoroalkyl, polychloroalkyl, polyfluoroalkylene and polychloroalkylene of up to 10 carbons; and *n*, the valence of R, is an integer of from 1 to 2.

10. The process of claim 9 employing tetracyanoethylene and trifluoromethanesulfenyl chloride.

11. The process of claim 10 wherein the solvent is acetonitrile.

12. The process of claim 9 employing tetracyanoethylene and 1,1,2,2-tetrafluoroethane-bis(sulfenyl chloride).

13. The process of claim 12 wherein the solvent is acetonitrile.

14. The process of claim 9 employing a catalyst of the group consisting of tetraethylammonium chloride and tetramethylammonium bromide and a temperature down to about −40° C.

15. The process of claim 14 employing tetracyanoethylene and trifluoromethanesulfenyl chloride in methylene chloride with tetraethylammonium chloride as a catalyst.

16. The process of claim 14 employing tetracyanoethylene and trichloromethanesulfenyl chloride in ethylene chloride.

References Cited by the Examiner
UNITED STATES PATENTS
2,779,780   1/57   Middleton _____ 260—465.5 X CHARLES B. PARKER, *Primary Examiner.*